(No Model.)

E. J. HESS.
VEHICLE SPRING.

No. 329,552.          Patented Nov. 3, 1885.

Attest.
O. M. Hill
W. S. Christopher

Inventor.
Elmer J. Hess
per Wm. Hubbell Fisher
Atty.

United States Patent Office.

ELMER J. HESS, OF CINCINNATI, OHIO, ASSIGNOR OF ONE-HALF TO ALFRED HESS, OF SAME PLACE.

VEHICLE-SPRING.

SPECIFICATION forming part of Letters Patent No. 329,552, dated November 3, 1885.

Application filed August 10, 1885. Serial No. 173,941. (No model.)

*To all whom it may concern:*

Be it known that I, ELMER J. HESS, of Cincinnati, Hamilton county, and State of Ohio, have invented certain new and useful Improvements in Springs, of which the following is a specification.

The various features and advantages of my invention will be set forth in the following description.

Figure 1:
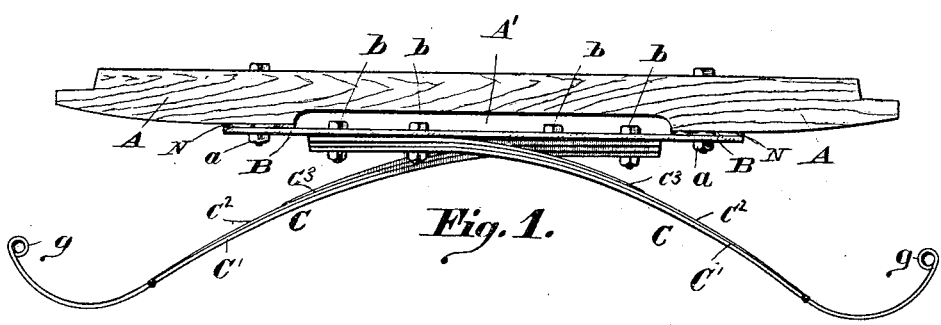
Figure 2:
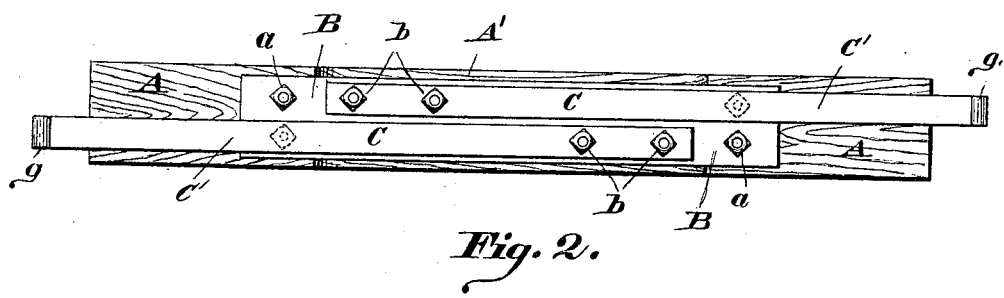

In the accompanying drawings, Figure 1 is a side elevation of my device. Fig. 2 is a view of the under side of the same.

The device is especially applicable to side-bar vehicles. Each spring (viewing it as an entirety) is attached to the usual body-supporting cross-bar, A, or equivalent attachment.

The spring consists as follows: A metallic, elastic, or spring plate, B, shorter than the width of the body, is rigidly secured at each end to the cross-bar A by bolts or screws $a$. This plate is sufficiently wide to accommodate the attachment of the two quarter-springs C C, and then two bolts or screws, $a$ $a$, are used at each end to secure it to the cross-bar. Each of the springs C is connected at its end $g$ to the side bar or equivalent part of the vehicle.

For the purpose of allowing the spring-plate B sufficient room for play, a space-recess, A', is present between the plate B and the cross-bar or equivalent portion of the vehicle. This space A' may be obtained by interposing a block of suitable material between the end of the plate B and the cross-bar A, the same construction being present at each end of plate B; but the preferable mode of obtaining this space A' is by cutting a recess in the cross-bar. This recess is cut in the under side of the cross-bar, and involves only the central portion, the end portions being left. In this way the strength of the end portions is not sacrificed. The two springs lie alongside of one another. Between each end of plate B and the adjacent part of the cross-bar A or vehicle-body a piece of rubber is preferably placed to form an easy and elastic seat for the spring-plate; but the presence of such a rubber is not essential to the operation of my spring. Each spring C may be made of a single piece of metal, C', bent to proper curve; but it is preferable to use the re-enforcing leaves $C^2$ $C^3$. Each spring C is attached to the plate B by the bolts $b$ $b$, the point of attachment being within the edge of the recess A', as shown. This point of attachment allows room for the heads of the bolts $b$ $b$ to play in the recess A'; but its great advantage is this: The spring being attached to the plate B at a point or points under the recess A'—that is, to the free portion of the plate—obtains the full benefit of the whole elasticity or resiliency of the plate B. In this way a very superior elastic spring is produced.

By reference to the drawings it will be seen the relative attachment of the two springs is such that they pass each other, and that each, from its attachment to the plate B, crosses the center line of the vehicle to proceed to its point of attachment to the side bar. The points of attachment of the two springs C being comparatively close combines the advantage of a single elliptic spring with those of the long-stretched cross-springs.

While the various features of my invention are preferably used together, one or more of them may be employed without the remainder, and be employed, so far as applicable, in connection with springs other than the one specifically herein described and claimed.

What I claim as new and of my invention, and desire to secure by Letters Patent, is—

1. The elastic plate B, of uniform width, secured at each end to a support, having above its middle portion the space or recess A', and the two crossed springs C C, each wholly attached to the plate B at a point within the extent of the space A', and passing over for attachment to the side bar of the opposite side, substantially as and for the purposes specified.

2. The combination of the cross-bar A, provided with recess A', and crossed springs arranged with their inner ends side by side, attached to the plate B within the space of the recess A', and extending in opposite directions across the median line of the vehicle for attachment to the side bars, substantially as and for the purposes specified.

3. A vehicle-spring composed of the springs C C, attached to the spring-bar B at or near its center, the spring bar or plate B, supported at each end by the cushions or rubber plates N N, and bar A, substantially as and for the purposes specified.

4. In a vehicle spring, the cushions or rubber plates N N, attached to the spring plate or bar B at its ends and forming a support for the same, in combination with said spring plate or bar, substantially as and for the purposes specified.

ELMER J. HESS.

Witnesses:
JNO. W. STREHLI,
O. M. HILL.